(12) United States Patent
Kim et al.

(10) Patent No.: US 12,522,315 B1
(45) Date of Patent: Jan. 13, 2026

(54) SEALED STORAGE COMPARTMENT FOR PERSONAL TRANSPORT DEVICE

(71) Applicant: Honda Motor Co., Ltd., Tokyo (JP)

(72) Inventors: Michael J. Kim, Long Beach, CA (US); Matthew B. Staal, Torrance, CA (US); Jackie P. Porchay, Torrance, CA (US); Nicholas P. Ziraldo, Powell, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 382 days.

(21) Appl. No.: 18/162,853

(22) Filed: Feb. 1, 2023

Related U.S. Application Data

(63) Continuation of application No. 17/466,620, filed on Sep. 3, 2021, now abandoned.

(51) Int. Cl.
 *B62K 15/00* (2006.01)
 *B62J 1/08* (2006.01)

(52) U.S. Cl.
 CPC .............. *B62K 15/006* (2013.01); *B62J 1/08* (2013.01)

(58) Field of Classification Search
 CPC .......... B62K 15/006; B62K 17/00; B62J 1/08
 See application file for complete search history.

(56) References Cited

U.S. PATENT DOCUMENTS

| | | | | |
|---|---|---|---|---|
| 3,316,993 | A | * | 5/1967 | Weitzner ............... A45C 9/00 180/209 |
| 5,097,922 | A | * | 3/1992 | Stagi ................. B62K 15/006 280/37 |
| 9,016,702 | B2 | | 4/2015 | Huang |
| 9,422,022 | B2 | * | 8/2016 | Sharkan ............... B62K 3/002 |
| 10,960,950 | B2 | * | 3/2021 | Zona ................. B62K 15/00 |
| 11,827,300 | B1 | * | 11/2023 | Staal .................. B62K 3/002 |
| 11,873,055 | B2 | * | 1/2024 | An ..................... B62K 15/00 |
| 11,932,302 | B1 | * | 3/2024 | Porchay ............... B62K 21/12 |
| 12,005,988 | B1 | * | 6/2024 | Staal .................. B62K 11/14 |
| 2004/0056442 | A1 | * | 3/2004 | Ostrowski ............ B62K 3/002 280/87.041 |
| 2011/0193304 | A1 | * | 8/2011 | Turner ................ B62B 3/009 280/37 |

FOREIGN PATENT DOCUMENTS

| CN | 2258358 Y | 7/1997 |
|---|---|---|
| CN | 201580494 U | 9/2010 |
| CN | 202728466 U | 2/2013 |

(Continued)

*Primary Examiner* — Brian L Swenson
(74) *Attorney, Agent, or Firm* — Plumsea Law Group, LLC

(57) ABSTRACT

A personal transport device in the form of an electric scooter is described. The personal transport device includes an outer casing having an opening extending along a top surface. The personal transport device also includes a front wheel, a rear wheel, a steering assembly, and a sealed storage compartment located inside the outer casing. The sealed storage compartment is configured to receive at least a portion of the steering assembly when the personal transport device is in a stowed configuration. The sealed storage compartment is also configured to prevent objects from falling into one or more internal mechanisms inside the outer casing when the personal transport device is in a riding configuration.

20 Claims, 14 Drawing Sheets

(56) References Cited

FOREIGN PATENT DOCUMENTS

| | | |
|---|---|---|
| CN | 105799839 B | 7/2016 |
| CN | 105799841 B | 7/2016 |
| CN | 205801362 U | 12/2016 |
| CN | 206155702 U | 5/2017 |
| CN | 108674555 A | 10/2018 |
| CN | 111003091 A | 4/2020 |
| CN | 211308861 U | 8/2020 |
| WO | 2016187838 A1 | 12/2016 |

* cited by examiner

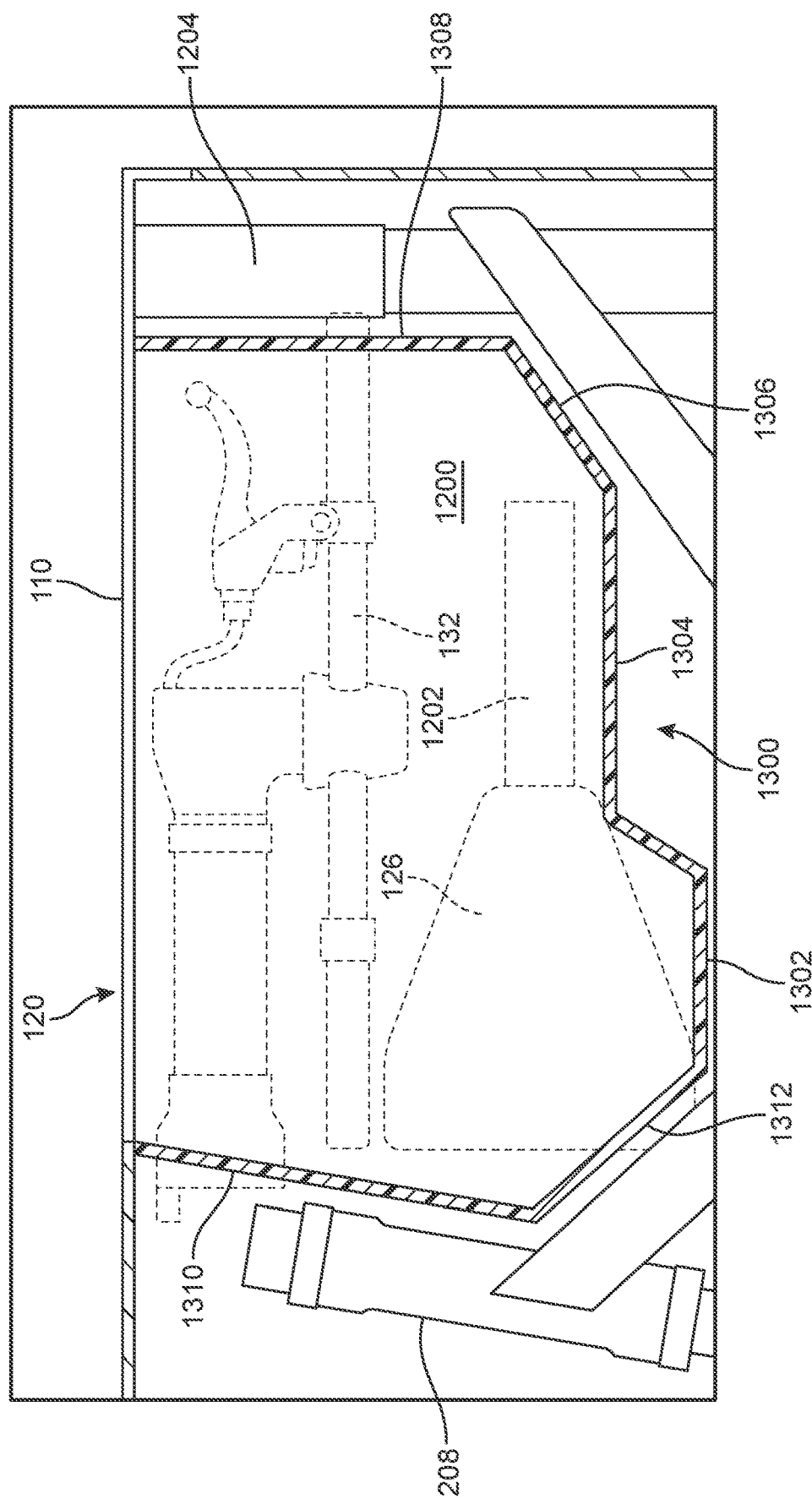

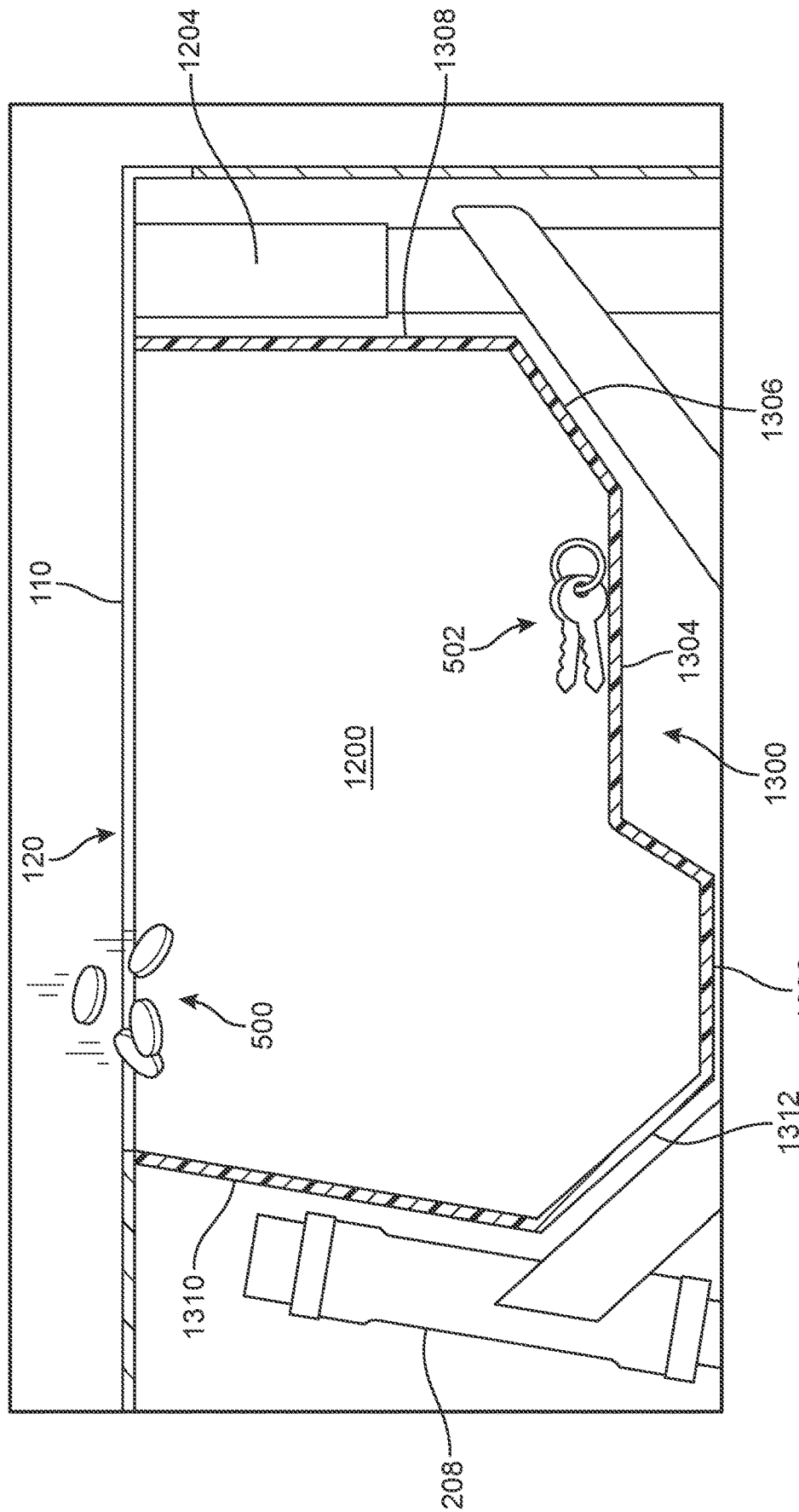

SEALED STORAGE COMPARTMENT FOR PERSONAL TRANSPORT DEVICE

CROSS-REFERENCE TO RELATED APPLICATION

This application is a continuation of and claims benefit to U.S. patent application Ser. No. 17/466,620, filed on Sep. 3, 2021 and titled "Sealed Storage Compartment for Personal Transport Device", the disclosure of which application is incorporated by reference herein in its entirety.

BACKGROUND

This disclosure relates generally to vehicles, and in particular to a compact personal transport device with an internal sealed storage compartment.

With rising prices of gasoline and automobiles, many people may turn to other more cost efficient modes of transportation such as, for example, mopeds, bicycles, kickboards and, more recently, compact personal transport devices, such as electric scooters. These personal transport devices may be particularly popular for shorter trips in a city environment due to their compact size, ease of use, mobility, and the fact that they may be folded as needed for ease of portability. They may also be useful for covering the first mile or last mile of a trip which is the link between a user's origin or destination and another transportation means, hub or mass transit network.

Accordingly, there is a need in the art for an improved compact personal transport device.

SUMMARY

In one aspect, a personal transport device is provided. The personal transport device includes an outer casing having an opening extending along a top surface. The personal transport device also includes a front wheel, a rear wheel, a steering assembly, and a sealed storage compartment located inside the outer casing. The sealed storage compartment is configured to receive at least a portion of the steering assembly when the personal transport device is in a stowed configuration. The sealed storage compartment is also configured to prevent objects from falling into one or more internal mechanisms inside the outer casing when the personal transport device is in a riding configuration.

In another aspect, a personal transport device is provided. The personal transport device includes an outer casing having an opening extending along a top surface. The personal transport device also includes a front wheel, a rear wheel, and a seat connected to a seat post. The seat post is attached internally inside the outer casing. The personal transport device further includes a sealed storage compartment located inside the outer casing. The sealed storage compartment is configured to receive the seat when the personal transport device is in a stowed configuration. The sealed storage compartment is also configured to prevent objects from falling into one or more internal mechanisms inside the outer casing when the personal transport device is in a riding configuration.

In another aspect, a personal transport device is provided. The personal transport device includes an outer casing having an opening extending along a top surface. The personal transport device also includes a front wheel, a steering assembly connected to the front wheel and configured to steer the front wheel of the personal transport device, a rear wheel, and a mechanism connected to the rear wheel configured to move the rear wheel between an extended position outside of the outer casing and a retracted position inside of the outer casing. The personal transport device further includes a seat connected to a seat post. The seat post is attached internally inside the outer casing. The personal transport device also includes a sealed storage compartment located inside the outer casing. The sealed storage compartment is configured to receive the seat and at least a portion of the steering assembly when the personal transport device is in a stowed configuration. The sealed storage compartment is also configured to prevent objects from falling into the mechanism connected to the rear wheel inside the outer casing when the personal transport device is in a riding configuration.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

FIG. 13 is an enlarged view of the alternate embodiment of a sealed storage compartment associated with the personal transport device shown in FIG. 12; and FIG. 14 is a representative view of objects falling into and resting along a bottom portion of the alternate embodiment of the sealed storage compartment.

DETAILED DESCRIPTION

Embodiments of a personal transport device with a sealed storage compartment are described herein. The personal transport device is convertible between a stowed configuration and a riding configuration. The sealed storage compartment may be used to store components of the personal transport device when the personal transport device is in the stowed configuration and may be used to store one or more objects (e.g., personal items, such as a phone, keys, coins, sunglasses, etc.) when the personal transport device is in the riding configuration. The techniques described in connection with the present embodiments may be used to provide a personal transport device having a sealed storage compartment that houses folded or stowed components of the personal transport device and also allows a user to carry one or more objects while the personal transport device is being ridden. The configuration of the sealed storage compartment according to the described embodiments prevents the objects from falling into the internal mechanisms of the personal transport device.

The example embodiments are described herein with reference to a personal transport device in the form of an electric scooter. As used herein, an electric scooter is a term used mainly to describe a scooter that is electrically powered. For example, this is a type of personal transport device that is gaining ridership in many locations. The principles of the example embodiments described herein may be applied to electric scooters or other types of personal transport devices, such as bicycles, unicycles, mopeds, skateboards, kickboards, wheelchairs, personal transporters, or the like.

In the example embodiments described herein, the electric scooter has an outer casing having a generally rectangular shape, including two flat sides having a length that is longer than a height. In addition, the electric scooter of the present embodiments has a width that is substantially smaller than the length and/or height of the electric scooter. In the example embodiments, the electric scooter may be transitioned from a stowed configuration in which components of the electric scooter are stored or disposed inside the rectangular outer casing to a riding configuration in which components of the electric scooter are folded or opened from their stored positions to extended positions outside of the outer casing so that the electric scooter may be operated or ridden by a user.

Figure 1:
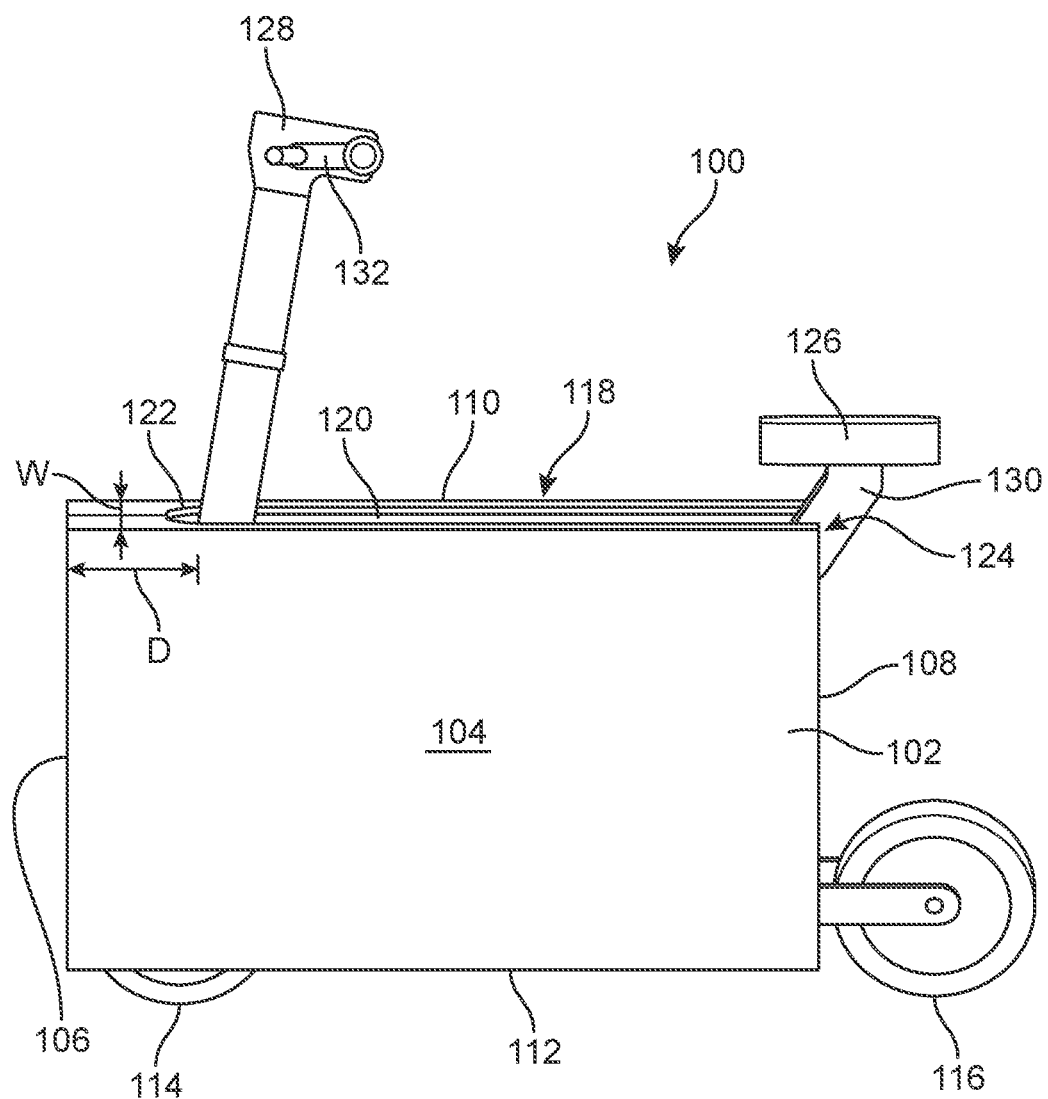
FIG. 1 is an isometric side view of an example embodiment of a personal transport device.

Referring now to FIG. 1, an example embodiment of a personal transport device 100 (e.g., in the form of an electric scooter 100) is shown. In some embodiments, electric scooter 100 may be transitioned or converted between a stowed configuration in which components of electric scooter 100 are stored or disposed inside an outer casing 102 to a riding configuration in which components of electric scooter 100 are folded or opened from their stored positions to extended positions outside of outer casing 102 so that electric scooter 100 may be operated or ridden by a user. As shown in FIG. 1, electric scooter 100 is in the riding configuration (FIG. 3, described in detail below, shows electric scooter 100 in the stowed configuration).

In this embodiment, outer casing 102 of electric scooter 100 includes a first side surface 104 (shown in FIG. 1) and an opposite second side surface (not shown). Outer casing 102 has a width (W) between first side surface 104 and the opposite second side surface that defines a thickness of electric scooter 100. In an example embodiment, side surfaces of outer casing 102 are substantially flat, including each of first side surface 104 and the opposite second side surface. Outer casing 102 of electric scooter 100 extends between a front edge 106 and an opposite rear edge 108, as well as a top edge 110 and an opposite bottom edge 112. Front edge 106, rear edge 108, top edge 110, and bottom edge 112 are substantially straight and define an outer perimeter of rectangular-shaped outer casing 102 of electric scooter 100.

In this embodiment, a front wheel 114 is visible along bottom edge 112 of electric scooter 100 near front edge 106. Electric scooter 100 also includes a rear wheel 116 that is shown extended outside of outer casing 102 (i.e., in the riding configuration as shown in FIG. 1) along bottom edge 112 near rear edge 108. Rear wheel 116 is configured to slide or retract inside of outer casing 102 in the stowed configuration via a mechanism, described below.

Electric scooter 100 includes a top surface 118 disposed between first side surface 104 and the opposite second side surface. In an example embodiment, top surface 118 includes an opening 120 extending substantially along the length of electric scooter 100 (i.e., from front edge 106 to rear edge 108). In one embodiment, opening 120 is disposed spaced from front edge 106 of electric scooter 100 and extends all the way to rear edge 108. For example, as shown in FIG. 1, opening 120 extends along top surface 118 from a first end 122 to a second end 124 located at rear edge 108. In this embodiment, first end 122 of opening 120 is spaced from front edge 106 by a distance (D) so that opening 120 is offset on top surface 118. In some embodiments, opening 120 extends to rear edge 108 along top surface 118 and partially extends down rear edge 108. In this embodiment, opening 120 is in the form of a slot disposed between first side surface 104 and the opposite second side surface.

In some embodiments, electric scooter 100 includes components configured to allow a user to ride electric scooter 100 in the riding configuration. For example, in this embodiment, electric scooter 100 includes a seat 126 and a steering assembly 128. In one embodiment, seat 126 is configured to mount to a seat post 130 that is attached internally to the inside of electric scooter 100 (e.g., inside outer casing 102). In one aspect, seat post 130 may be attached internally via a pivot mechanism (e.g., pivot mechanism 202 shown in FIG. 2). In other aspects, seat 126 and seat post 130 may be attached internally to the inside of electric scooter 100 via other attachment mechanisms, including, but not limited to folding mechanisms and/or linkage mechanisms. Steering assembly 128 is configured to control orientation of front wheel 114 to allow a user to steer electric scooter 100 in the riding configuration. In an example embodiment, steering assembly 128 includes a handlebar 132 that is configured to receive hands of a user to steer front wheel 114.

It should be understood that a personal transport device according to the embodiments described herein may include additional components not shown or described. For example, a personal transport device in the form of an electric scooter (e.g., electric scooter 100) may include components such as a battery, throttle and brake controls, etc. that allow a user to ride the electric scooter. Other embodiments of personal transport devices may also include additional or different components without departing from the techniques of the present embodiments described herein.

Figure 2:
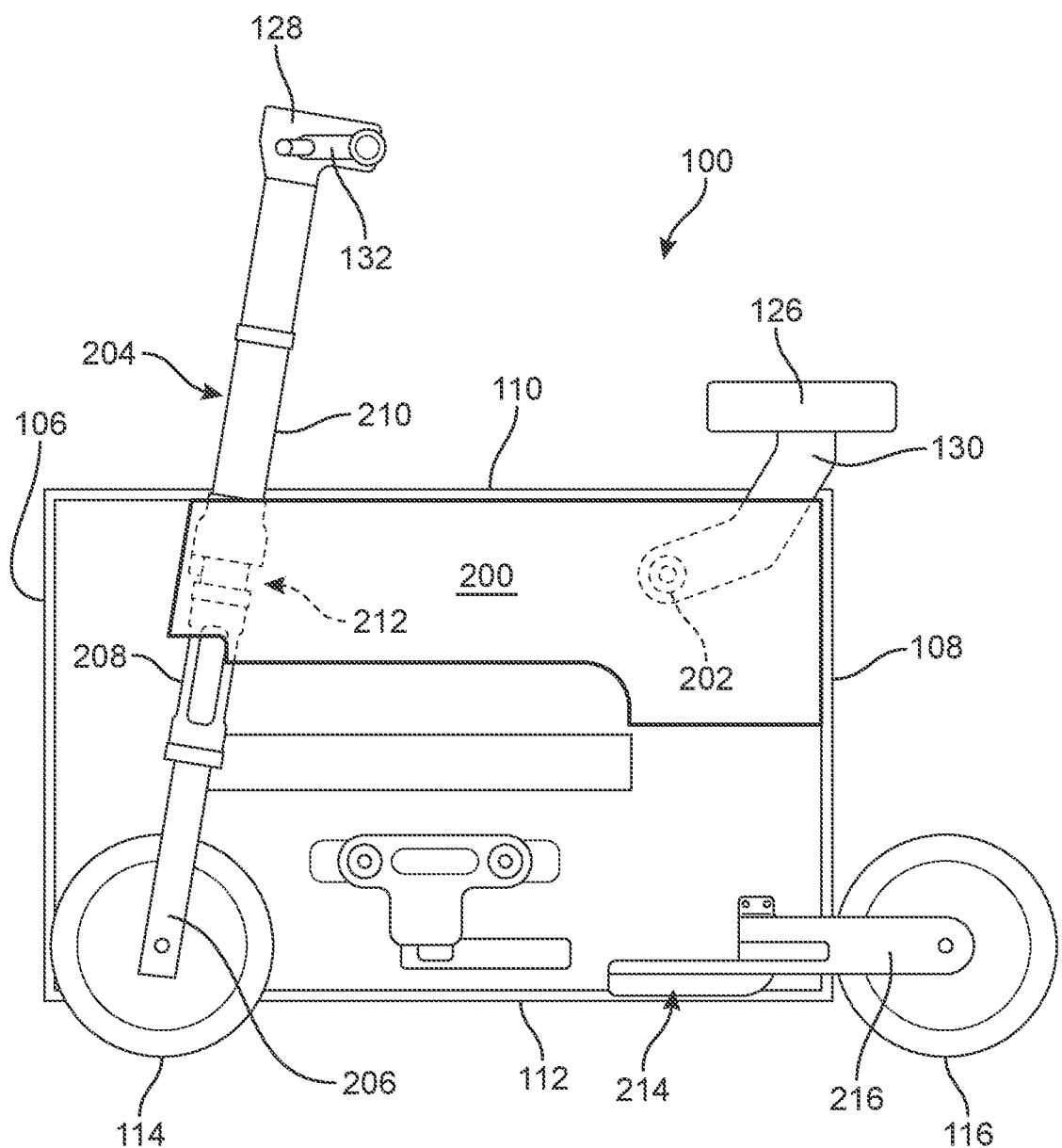
FIG. 2 is a representative view of internal components of the personal transport device showing an example embodiment of a sealed storage compartment.

Referring now to FIG. 2, internal components of electric scooter 100 are shown. In an example embodiment, electric scooter 100 is provided with an internal sealed storage compartment 200 inside outer casing 102. As will be described in more detail below, sealed storage compartment 200 is configured to store one or more objects (e.g., personal items, such as a phone, keys, coins, sunglasses, etc.) when electric scooter 100 is in the riding configuration (as shown in FIG. 2) and is also configured to store components of electric scooter 100 (e.g., portions of steering assembly 128 and/or seat 126) when electric scooter 100 is in the stowed configuration (as shown in FIG. 3).

As shown in FIG. 2, a pivot mechanism 202 is attached internally inside outer casing 102 of electric scooter 100 and is attached to seat post 130. When electric scooter 100 is in the riding configuration (as shown in FIGS. 1 and 2), a portion of seat post 130 is extended outside of outer casing 102 so that a user may sit on seat 126 to ride electric scooter 100 in the riding configuration. When electric scooter 100 is transitioned between the riding configuration (as shown in FIGS. 1 and 2) and the stowed configuration (as shown in FIG. 3), seat post 130 pivots around pivot mechanism 202 to a position outside of outer casing 102 of electric scooter 100 when in the riding configuration and to a position within sealed storage compartment 200 inside outer casing 102 when in the stowed configuration.

In an example embodiment, steering assembly 128 includes a steering shaft 204 with a fork 206 that is attached to an axle of front wheel 114 at one end. The opposite end of fork 206 is attached to a lower portion 208 of steering shaft 204. Handlebar 132 is located at a top end of steering shaft 204 and is connected to an upper portion 210 of steering shaft 204. Upper portion 210 of steering shaft 204 extends downwards towards top edge 110 of electric scooter 100 and is extended outside of outer casing 102 of electric scooter 100 through opening 120 when electric scooter 100 is in the riding configuration. Lower portion 208 of steering shaft 204 extends upwards towards top edge 110 of electric scooter 100 to a shaft connection mechanism 212. Shaft connection mechanism 212 includes a hinge (or similar mechanism) that connects lower portion 208 and upper portion 210 of steering shaft 204. With this arrangement, steering assembly 128 may be transitioned or converted from an upright extended position when electric scooter 100 is in the riding configuration (as shown in FIGS. 1 and 2) to a folded position when electric scooter 100 is in the stowed configuration (as shown in FIG. 3).

Figure 3:
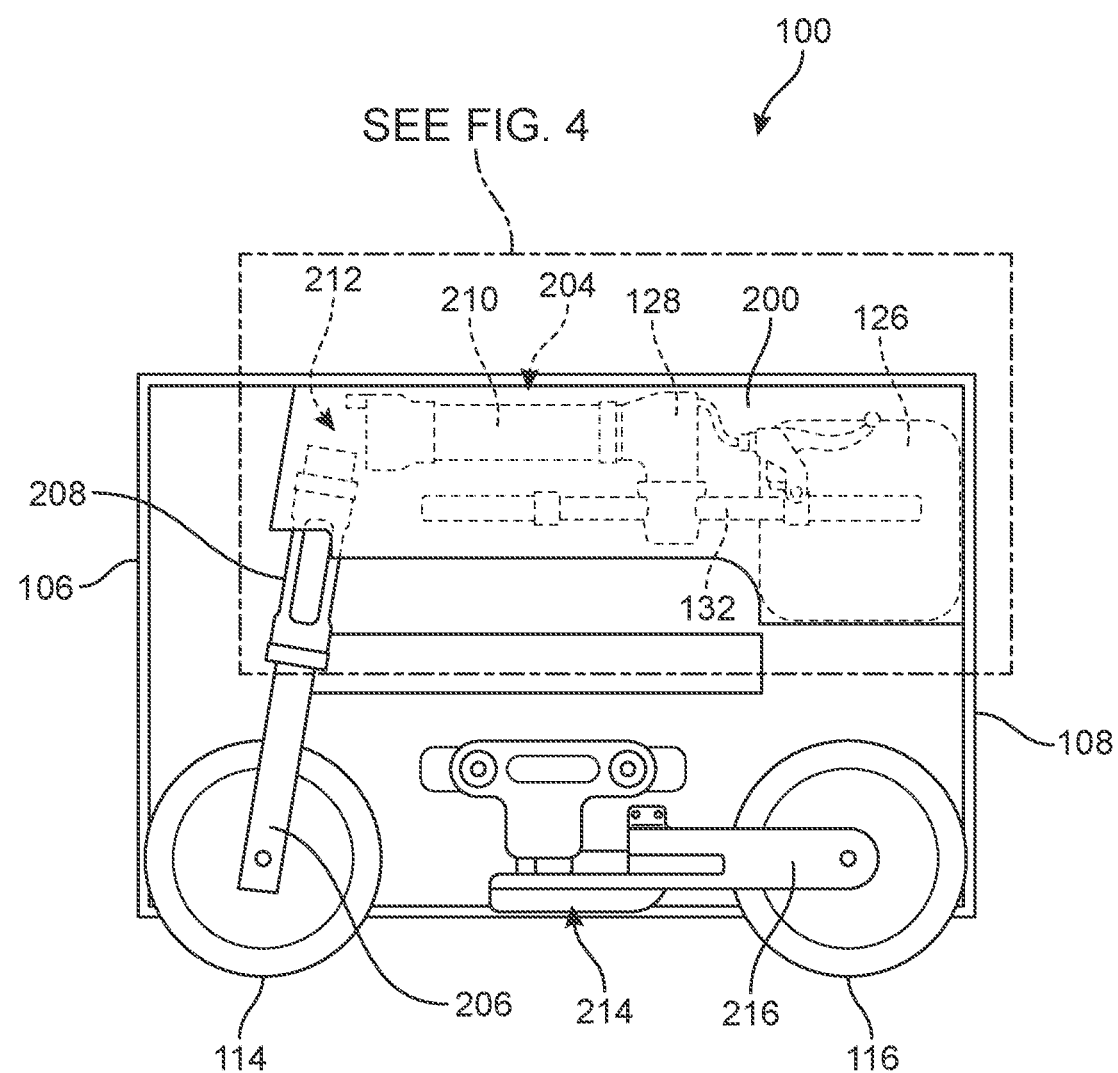
FIG. 3 is a representative view of external components of the personal transport device stowed within the example embodiment of a sealed storage compartment.

In an example embodiment, rear wheel 116 is configured to move or transition between an extended position outside of outer casing 102 when electric scooter 100 is in the riding configuration (as shown in FIGS. 1 and 2) to a stowed position located inside outer casing 102 of electric scooter 100 in the stowed configuration (as shown in FIG. 3). In some embodiments, a sliding mechanism 214 may be used to slideably move rear wheel 116 between the riding configuration and the stowed configuration. In an example embodiment, sliding mechanism 214 may include an arm 216 attached to an axle of rear wheel 116 at one end. Arm 216 is configured to engage with a stop mechanism (not shown) at the opposite end to control linear movement of rear wheel 116. With this arrangement, arm 216 may be pulled in a direction towards rear edge 108 of electric scooter 100 to extend rear wheel 116 outside of outer casing 102. The stop mechanism stops the linear movement of rear wheel 116 by engaging with the opposite end of arm 216 once rear wheel 116 reaches the fully extended position outside of outer casing 102.

According to the techniques of the present embodiments, sealed storage compartment 200 is configured to prevent objects (e.g., personal items, such as a phone, keys, coins, sunglasses, etc.) from falling into internal mechanisms inside outer casing 102 of electric scooter 100, such as, sliding mechanism 214. In an example embodiment, sealed storage compartment 200 is located beneath opening 120 on top surface 118 of electric scooter 100. Sealed storage compartment 200 is further located above one or more internal mechanisms inside electric scooter 100, including, for example, sliding mechanism 214. With this arrangement, sealed storage compartment 200 acts as a barrier to prevent or stop objects that enter inside outer casing 102 of electric scooter 100 through opening 120 from falling into or obstructing the internal mechanisms inside electric scooter 100.

For example, without sealed storage compartment 200, one or more objects may pass through opening 120 on top surface 118 of electric scooter 100 and block or interfere with sliding mechanism 214, thereby preventing rear wheel 116 from extending out from or retracting into outer casing 102. The arrangement of internal sealed storage compartment 200 inside electric scooter 100, however, prevents damage and/or interference with the function of the internal mechanisms of electric scooter 100 from such objects.

Referring now to FIG. 3, electric scooter 100 is shown in the stowed configuration. For example, in this embodiment, one or more components of electric scooter 100 that were previous located outside of outer casing 102 in the riding configuration are shown inside outer casing 102 in the stowed configuration. For example, as shown in this embodiment, steering assembly 128 has been folded at shaft connection mechanism 212 so that handlebar 132 and upper portion 210 of steering shaft 204 passes through opening 120 to be located within sealed storage compartment 200 in the stowed configuration. Additionally, in this embodiment, seat 126 has also been folded inside outer casing 102 in the stowed configuration. For example, seat 126 passes through opening 120 by rotating around pivot mechanism 202 so that seat 126 may be located within sealed storage compartment 200 in the stowed configuration. With this arrangement, sealed storage compartment 200 is configured to receive at least a portion of steering assembly 128 and/or seat 126 when electric scooter 100 is in the stowed configuration.

Figure 4:
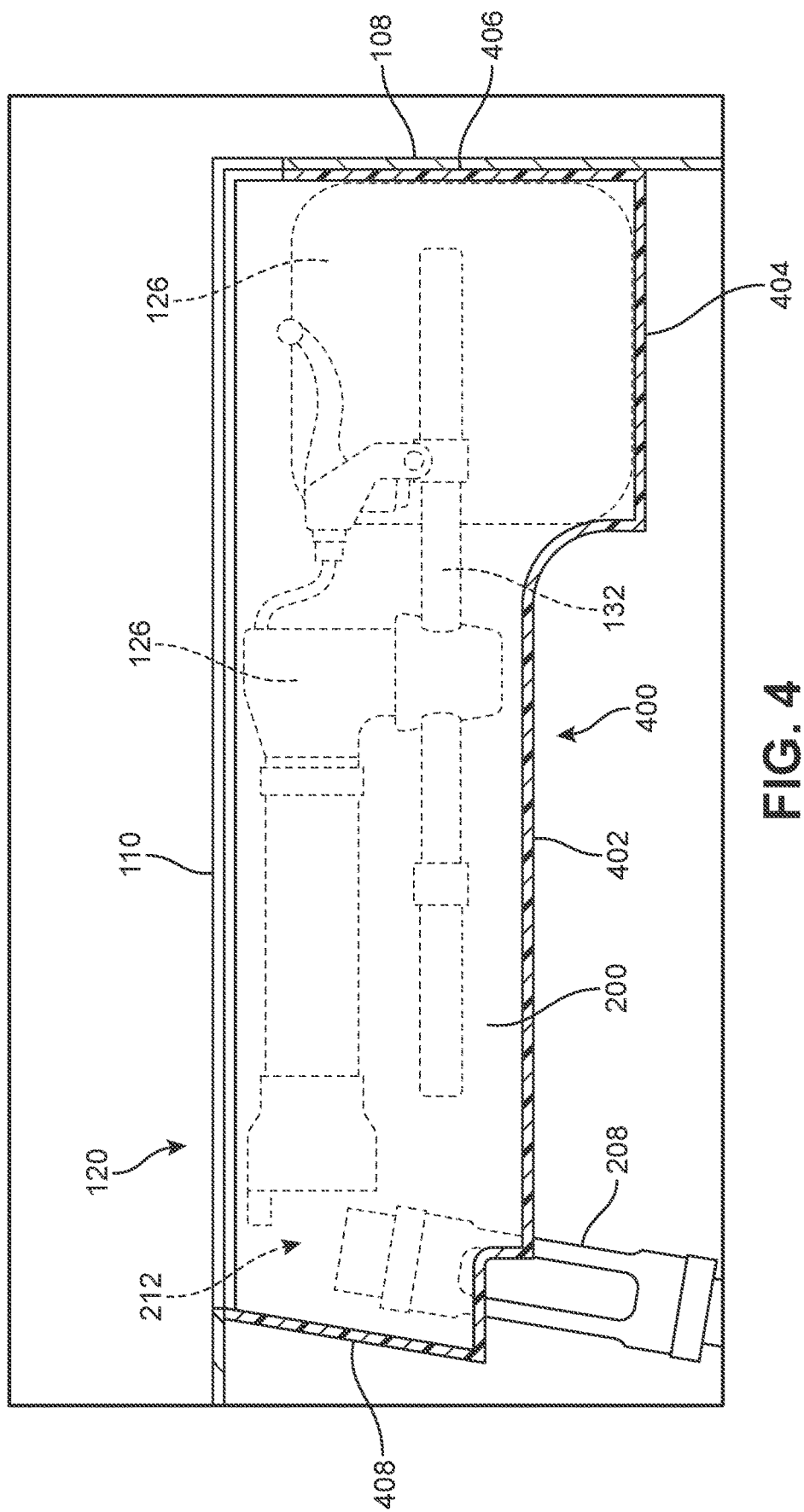
FIG. 4 is an enlarged view of the example embodiment of a sealed storage compartment associated with the personal transport device shown in FIG. 3.

Referring now to FIG. 4, an enlarged cross-section view of electric scooter 100 taken from the area shown in FIG. 3 is shown. In particular, the cross-section view of FIG. 4 is taken through opening 120 along top edge 110 of electric scooter 100 so that in this view of sealed storage compartment 200, the top is open to the outside of electric scooter 100. In addition, the folded components of electric scooter 100 in the stowed configuration are shown being stored within sealed storage compartment 200 (e.g., portions of steering assembly 128, including handlebar 132 and upper portion 210 of steering shaft 204, as well as seat 126).

In an example embodiment, sealed storage compartment 200 includes a perimeter wall 400 that surrounds and defines the outer perimeter of sealed storage compartment 200. In an example embodiment, sealed storage compartment 200 has a generally rectangular shape. In this embodiment, perimeter wall 400 includes a bottom portion comprising a first bottom portion 402 and a second bottom portion 404. In this embodiment, second bottom portion 404 extends deeper (i.e., farther down from top edge 110) than first bottom portion 402 to accommodate the shape and size of seat 126, when in the stowed configuration. It should be understood, however, that other configurations of the bottom portion of sealed storage compartment 200 may be provided to accommodate differently shaped and/or sized components of electric scooter 100 that may be folded into sealed storage compartment 200 in the stowed configuration.

Perimeter wall 400 also includes a first side portion 406 adjacent to rear edge 108 of electric scooter 100 that extends upwards from second bottom portion 404 towards top edge 110 of electric scooter 100. Perimeter wall 400 also includes a second side portion 408 located opposite first side portion 406 towards front edge 106 of electric scooter 100 that extends upwards from first bottom portion 402 towards top edge 110 of electric scooter 100. In an example embodiment, perimeter wall 400 of sealed storage compartment 200 is continuous through at least first side portion 406, first bottom portion 402, second bottom portion 404, and second side portion 408. With this arrangement, perimeter wall 400 of sealed storage compartment 200 defines the storage space of sealed storage compartment 200 that may be used to store components of electric scooter 100 in the stowed configuration and to store small objects (e.g., personal items, such as a phone, keys, coins, sunglasses, etc.) when electric scooter 100 is in the riding configuration.

Figure 5:
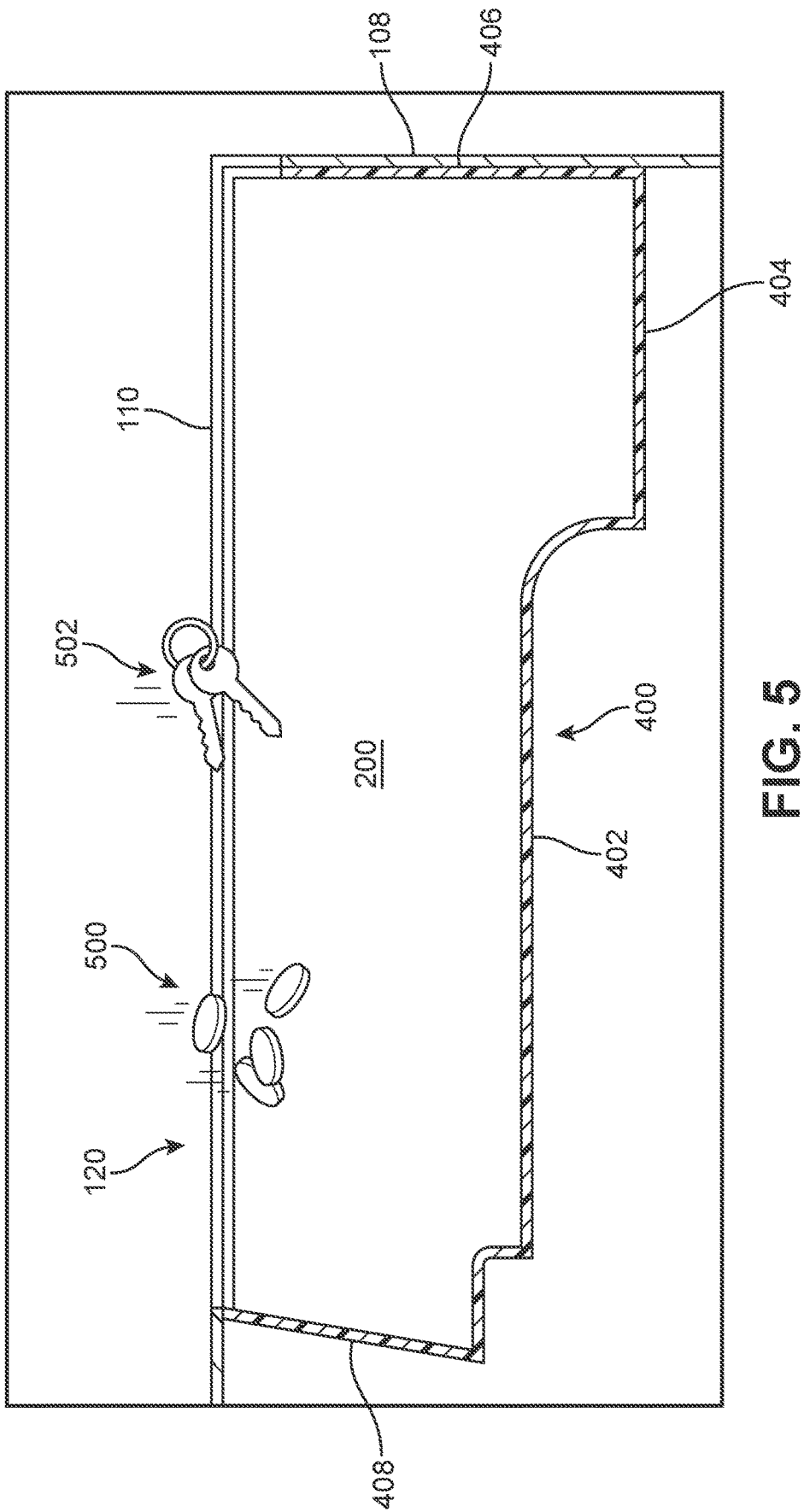
FIG. 5 is a representative view of objects falling into the example embodiment of the sealed storage compartment.

In some embodiments, sealed storage compartment 200 is configured to prevent small objects (e.g., personal items, such as a phone, keys, coins, sunglasses, etc.) stored within sealed storage compartment 200 from falling into internal mechanisms of electric scooter 100, such as, for example, sliding mechanism 214 for rear wheel 116, described above. Referring now to FIG. 5, a representative view of objects falling into sealed storage compartment 200 is shown. As shown in FIG. 5, one or more objects, for example, coins 500 and/or keys 502, may be placed or fall into sealed storage compartment 200 through opening 120 along top edge 110 of electric scooter 100.

Figure 6:
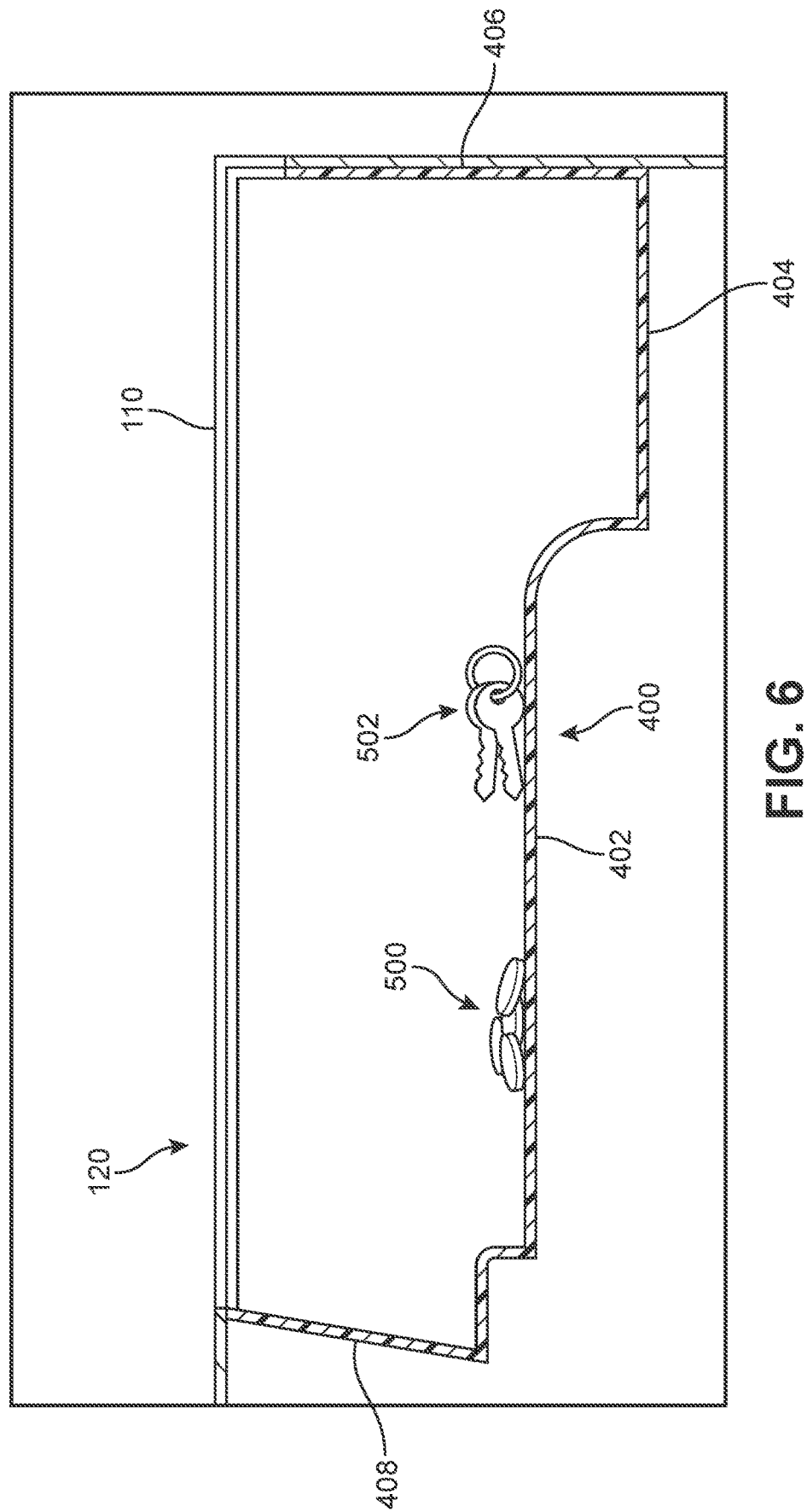
FIG. 6 is a representative view of fallen objects resting along a bottom portion of the example embodiment of the sealed storage compartment.

Once the objects (e.g., coins 500 and keys 502) are within sealed storage compartment 200, the bottom portion of perimeter wall 400, including first bottom portion 402 and/or second bottom portion 404, act to stop objects 500, 502 from falling farther into the interior of electric scooter 100 and interfering with or damaging internal mechanisms, such as sliding mechanism 214. For example, as shown in FIG. 6, fallen objects (e.g., coins 500 and keys 502) are resting along first bottom portion 402 of perimeter wall 400 within sealed storage compartment 200. Second bottom portion 404 may similarly prevent objects 500, 502 from falling father into the interior of electric scooter 100. For example, while electric scooter 100 is being ridden in the riding configuration, objects 500, 502 may move around within sealed storage compartment 200. Second bottom portion 404 of perimeter wall 400 of sealed storage compartment 200 catches objects 500, 502 from falling farther into the interior of electric scooter 100 and interfering with or damaging the internal mechanisms.

With this arrangement, sealed storage compartment 200 is configured to house or store folded or stowed components of electric scooter 100 in the stowed configuration and also allows a user to carry one or more objects within sealed storage compartment 200 while electric scooter 100 is being ridden without those objects falling into internal mechanisms of electric scooter 100.

Figure 7:
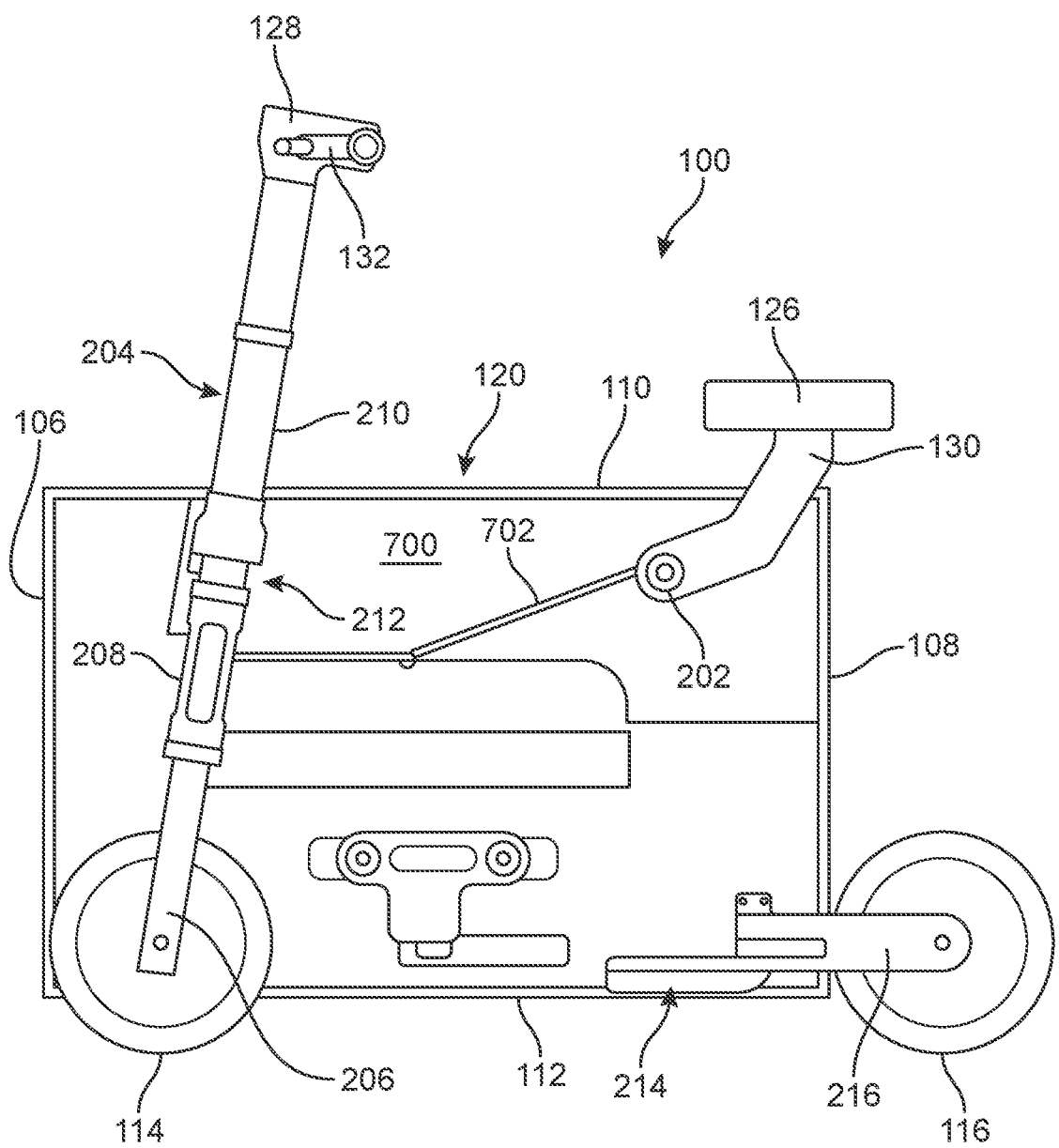
FIG. 7 is a representative view of internal components of a personal transport device showing an alternate embodiment of a sealed storage compartment.

In some embodiments, the bottom portion of the sealed storage compartment may include a hinged panel that is configured to move along with components of the electric scooter that are folded or extending into or out of the interior of the sealed storage compartment. Referring now to FIG. 7, internal components of electric scooter 100 showing an alternate embodiment of a sealed storage compartment 700 having a hinged panel 702 is shown.

Figure 8:
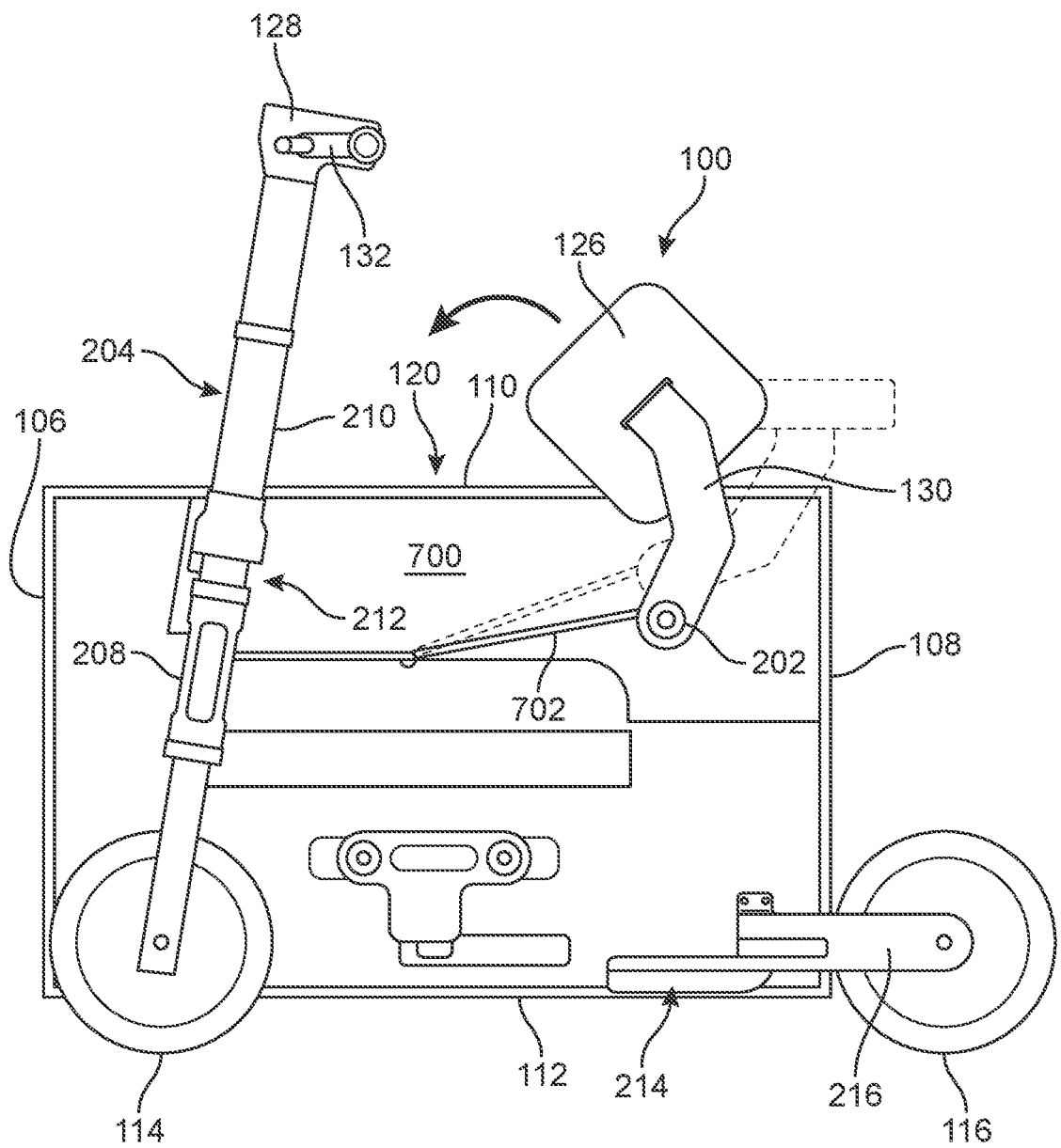
FIG. 8 is representative view of the personal transport device showing a hinged panel on a bottom portion of the alternate embodiment of a sealed storage compartment.

In an example embodiment, sealed storage compartment 700 has a substantially similar configuration as sealed storage compartment 200, described above. In this embodiment, sealed storage compartment 700 includes hinged panel 702 along the bottom portion of sealed storage compartment 700 that is configured to move along with seat 126 as seat is transitioned between the riding configuration and the stowed configuration. For example, as shown in FIG. 8, as seat 126 is folded into opening 120 on top edge 110 of electric scooter 100, hinged panel 702 on the bottom portion of sealed storage compartment 700 moves from its initial position shown in FIG. 7 (shown here in FIG. 8 with dashed lines) to a lower position that is farther from opening 120 along top edge 110 than its initial position.

With this arrangement, hinged panel 702 of sealed storage compartment 700 is configured to move along with seat 126 to provide internal space within sealed storage compartment 700 to house or store seat 126 in the stowed configuration. In addition, when hinged panel 702 is in the initial position when electric scooter 100 is in the riding configuration, hinged panel 702 provides a sloped surface that is configured to channel or direct objects that fall through opening 120 on top edge 110 of electric scooter 100 towards the bottom portion of sealed storage compartment 700 where they may rest without interfering with or damaging internal components of electric scooter 100, such as sliding mechanism 214 for rear wheel 116.

Figure 9:
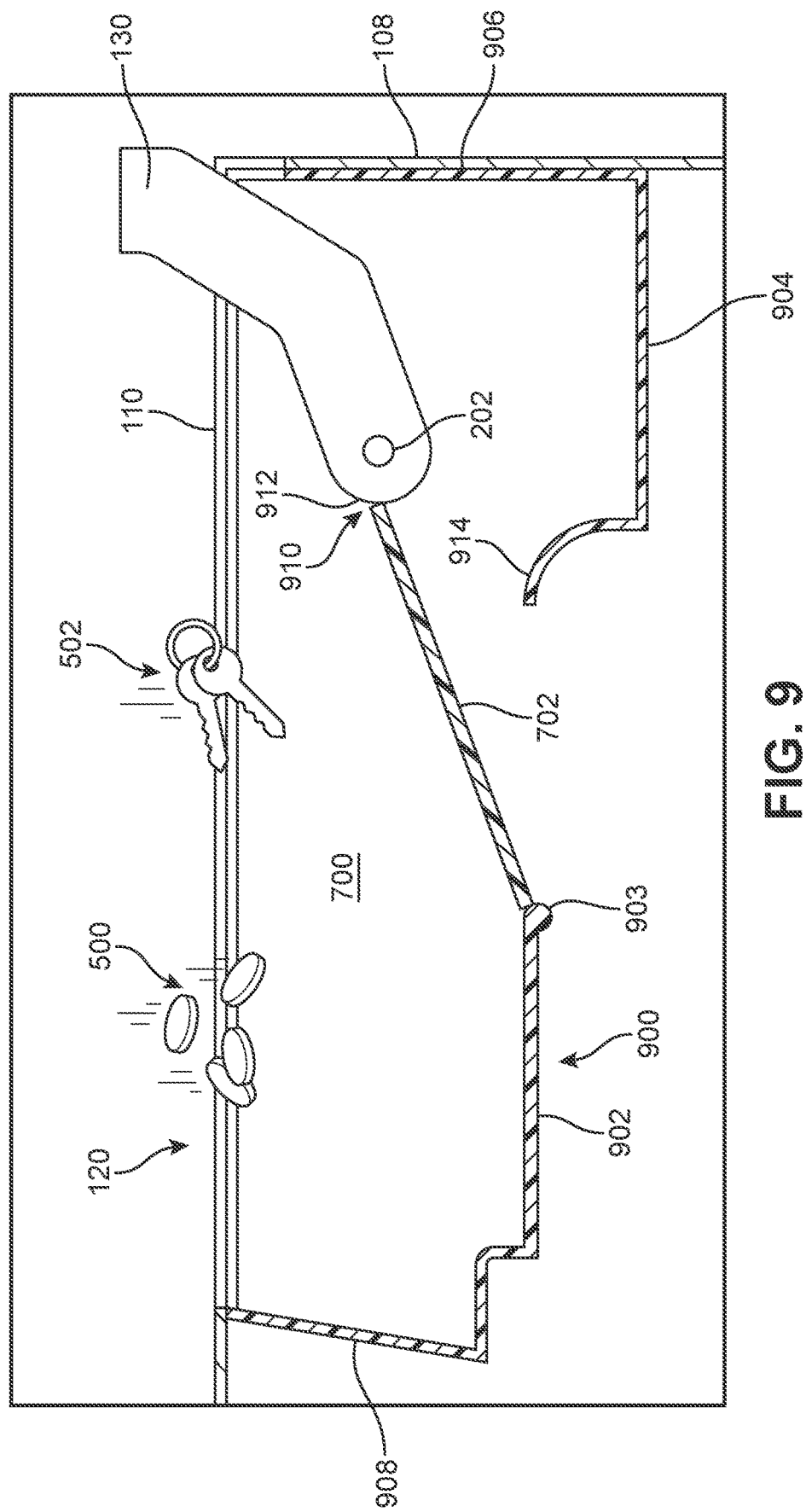
FIG. 9 is a representative view of objects falling into the alternate embodiment of the sealed storage compartment.

Referring now to FIG. 9, sealed storage compartment 700 includes a perimeter wall 900 that surrounds and defines the outer perimeter of sealed storage compartment 700. In this embodiment, perimeter wall 900 includes a bottom portion comprising a first bottom portion 902, movable hinged panel 702, and a second bottom portion 904. In this embodiment, second bottom portion 904 extends deeper (i.e., farther down from top edge 110) than first bottom portion 902 to accommodate the shape and size of seat 126, when in the stowed configuration. It should be understood, however, that other configurations of the bottom portion of sealed storage compartment 700 may be provided to accommodate differently shaped and/or sized components of electric scooter 100 that may be folded into sealed storage compartment 700 in the stowed configuration.

In an example embodiment, hinged panel 702 on the bottom portion of sealed storage compartment 700 is connected or attached to first bottom portion 902 via a hinge 903 that is configured to allow hinged panel 702 to move upwards towards top edge 110 and back downwards towards a lip member 914 extending from second bottom portion 904. A distal end 910 of hinged panel 702 is located at the opposite end from hinge 903. Distal end 910 of hinged panel 702 is configured to rest against an end portion 912 of seat post 130 at or near pivot mechanism 202. In an example embodiment, distal end 910 remains unattached to end portion 912 of seat post 130 so that distal end 910 may slide or move against the surface of end portion 912 of seat post 130 as seat 126 is folded into sealed storage compartment 700 (as shown in FIG. 8) in the stowed configuration and/or extended out of sealed storage compartment 700 in the riding configuration.

Perimeter wall 900 also includes a first side portion 906 adjacent to rear edge 108 of electric scooter 100 that extends upwards from second bottom portion 904 towards top edge 110 of electric scooter 100. Perimeter wall 900 also includes a second side portion 908 located opposite first side portion 906 towards front edge 106 of electric scooter 100 that extends upwards from first bottom portion 902 towards top edge 110 of electric scooter 100. With this arrangement, perimeter wall 900 of sealed storage compartment 700 defines the storage space of sealed storage compartment 700 that may be used to store components of electric scooter 100 in the stowed configuration and to store small objects (e.g., personal items, such as a phone, keys, coins, sunglasses, etc.) when electric scooter 100 is in the riding configuration.

In an example embodiment, sealed storage compartment 700 is located beneath opening 120 on top surface 118 of electric scooter 100. Sealed storage compartment 700 is further located above one or more internal mechanisms inside electric scooter 100, including, for example, sliding mechanism 214. With this arrangement, sealed storage compartment 700 acts as a barrier to prevent or stop objects that enter inside outer casing 102 of electric scooter 100 through opening 120 from falling into or obstructing the internal mechanisms inside electric scooter 100.

As shown in FIG. 9, one or more objects, for example, coins 500 and/or keys 502, may be placed or fall into sealed storage compartment 700 through opening 120 along top edge 110 of electric scooter 100. Once the objects (e.g., coins 500 and keys 502) are within sealed storage compartment 700, the bottom portion of perimeter wall 900, including first bottom portion 902 and/or hinged panel 702, act to stop objects 500, 502 from falling farther into the interior of electric scooter 100 and interfering with or damaging internal mechanisms, such as sliding mechanism 214.

Figure 10:
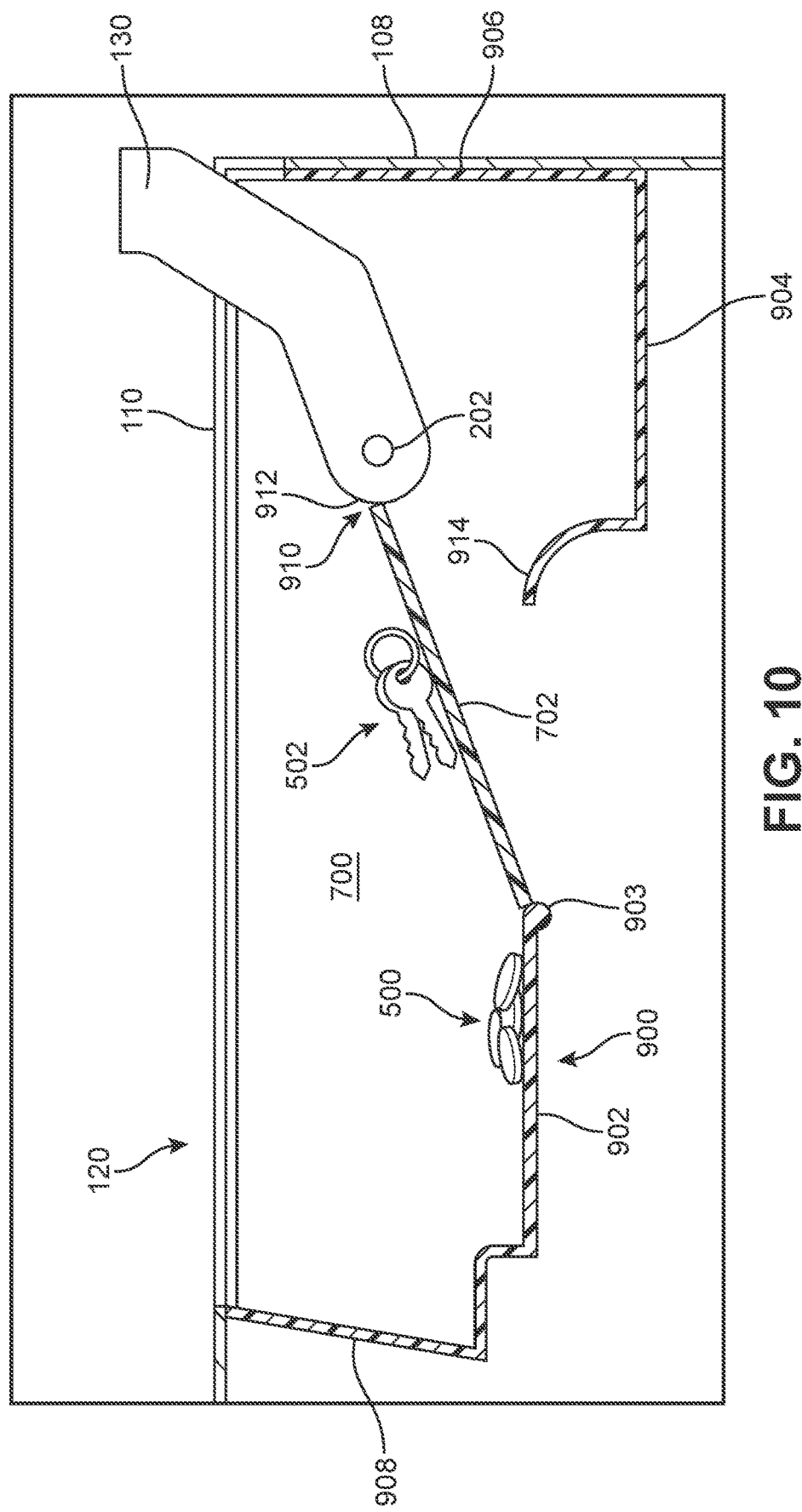
FIG. 10 is a representative view of fallen objects resting along the hinged panel and bottom portion of the alternate embodiment of the sealed storage compartment.

For example, as shown in FIG. 10, fallen objects (e.g., coins 500 and keys 502) are resting along the bottom portion of sealed storage compartment 700, with coins 500 resting along first bottom portion 902 of perimeter wall 900 within sealed storage compartment 700 and keys 502 resting along hinged panel 702 within sealed storage compartment 700. In addition, the sloped surface of hinged panel 702 extending between hinge 903 and distal end 910 is configured to channel or direct objects 500, 502 towards first bottom portion 902 of sealed storage compartment 700 where they may rest without interfering with or damaging internal components of electric scooter 100, such as sliding mechanism 214 for rear wheel 116.

With this arrangement, sealed storage compartment 700 is configured to house or store folded or stowed components of electric scooter 100 in the stowed configuration and also allows a user to carry one or more objects within sealed storage compartment 700 while electric scooter 100 is being ridden without those objects falling into internal mechanisms of electric scooter 100.

Figure 11:
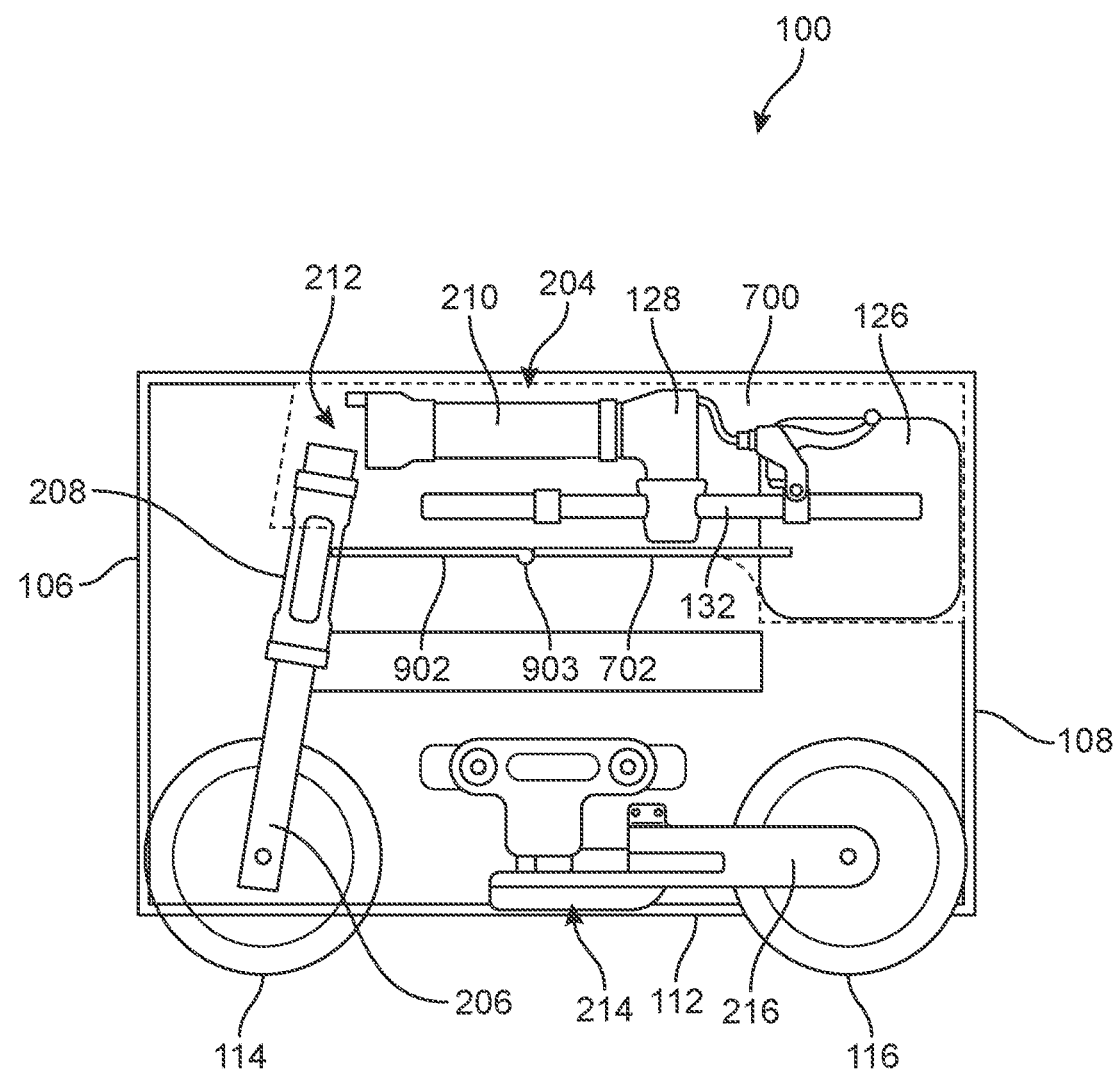
FIG. 11 is a representative view of external components of the personal transport device stowed within the alternate embodiment of a sealed storage compartment.

FIG. 11 is a representative view of external components of electric scooter 100 folded inside sealed storage compartment 700 when electric scooter 100 is in the stowed configuration. In this embodiment, one or more components of electric scooter 100 that were previous located outside of outer casing 102 in the riding configuration are shown inside outer casing 102 in the stowed configuration. For example, as shown in this embodiment, steering assembly 128 has been folded at shaft connection mechanism 212 so that handlebar 132 and upper portion 210 of steering shaft 204 passes through opening 120 to be located within sealed storage compartment 700 in the stowed configuration. Additionally, in this embodiment, seat 126 has also been folded inside outer casing 102 in the stowed configuration. For example, seat 126 passes through opening 120 by rotating around pivot mechanism 202 so that seat 126 may be located within sealed storage compartment 700 in the stowed configuration. With this arrangement, sealed storage compartment 700 is configured to receive at least a portion of steering assembly 128 and/or seat 126 when electric scooter 100 is in the stowed configuration.

Figure 12:
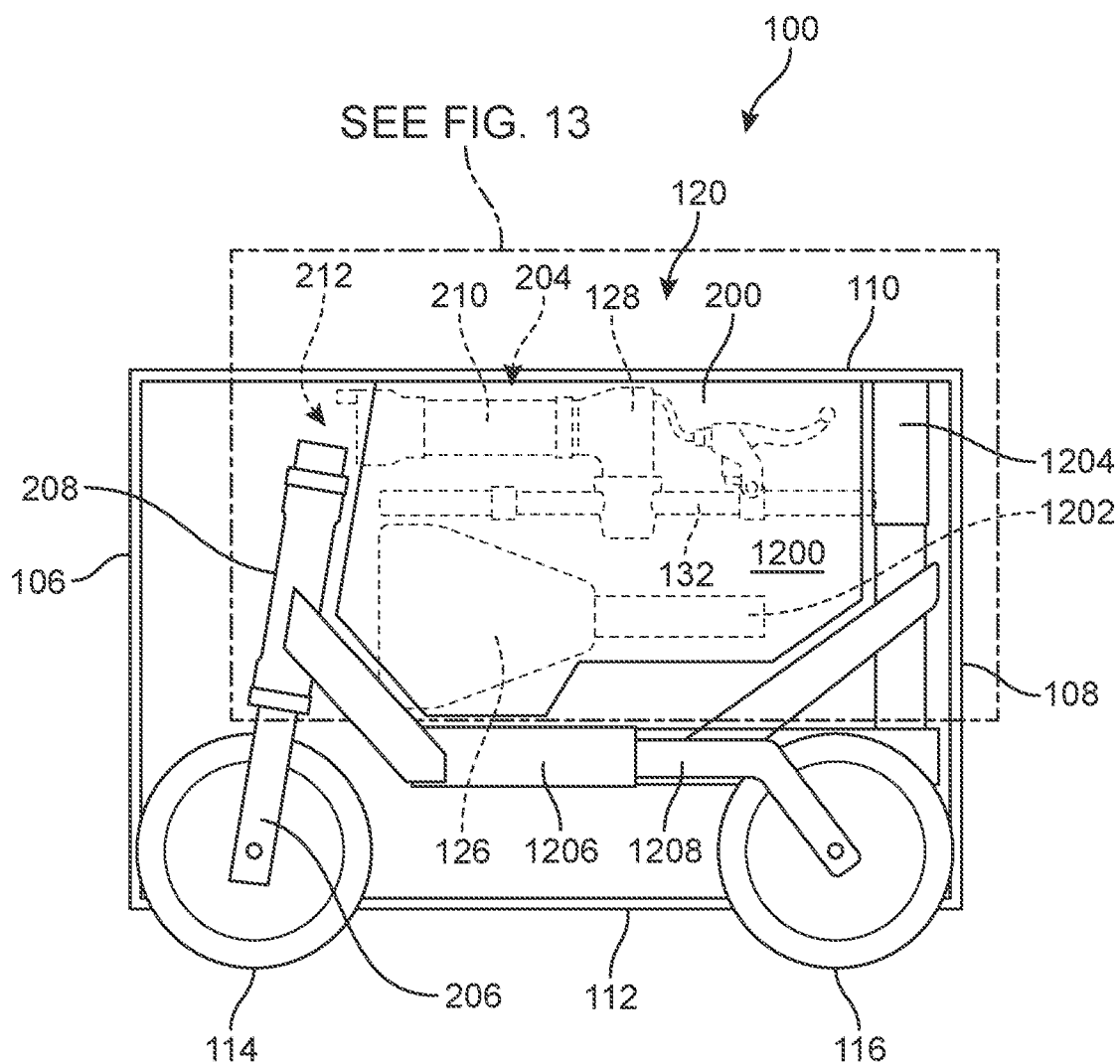
FIG. 12 is a representative view of internal components of a personal transport device showing an alternate embodiment of a sealed storage compartment.

In some embodiments, a sealed storage compartment having a larger storage area (e.g., by volume) within the interior of electric scooter 100 may be provided to accommodate larger items. Referring now to FIG. 12, electric scooter 100 is shown in the stowed configuration with an alternate embodiment of a sealed storage compartment 1200. In this embodiment, sealed storage compartment 1200 has a larger storage area (e.g., by volume) than previous embodiments, including sealed storage compartment 200 and sealed storage compartment 700. Additionally, in some embodiments, sealed storage compartment 1200 is deeper so that it extends farther from opening 120 along top edge 110 towards bottom edge 112 of electric scooter 100. For example, in this embodiment, the bottom of sealed storage compartment 1200 is located above a sliding mechanism 1206 and an arm 1208 of rear wheel 116. With this configuration, sealed storage compartment 1200 may accommodate larger objects than previous embodiments, including sealed storage compartment 200 and sealed storage compartment 700.

In this embodiment, one or more components of electric scooter 100 that were previous located outside of outer casing 102 in the riding configuration are shown inside outer casing 102 in the stowed configuration. For example, as shown in this embodiment, steering assembly 128 has been folded at shaft connection mechanism 212 so that handlebar 132 and upper portion 210 of steering shaft 204 passes through opening 120 to be located within sealed storage compartment 1200 in the stowed configuration.

In one embodiment, seat 126 may be removable from electric scooter 100. For example, in this embodiment, seat 126 is connected to a seat post 1202 that is configured to be inserted into a seat post receiving tube 1204. Seat post receiving tube 1204 extends substantially vertically inside outer casing 102 of electric scooter 100 between top edge 110 and bottom edge 112. When electric scooter 100 is in the riding configuration, seat post 1202 may be inserted into seat post receiving tube 1204 so that a user of electric scooter 100 may sit on seat 126. In this embodiment, seat 126 with attached seat post 1202 has been placed inside sealed storage compartment 1200 in the stowed configuration. With this arrangement, sealed storage compartment 1200 is configured to receive at least a portion of steering assembly 128 and/or seat 126 when electric scooter 100 is in the stowed configuration.

Referring now to FIG. 13, an enlarged cross-section view of electric scooter 100 taken from the area shown in FIG. 12 is shown. In particular, the cross-section view of FIG. 13 is taken through opening 120 along top edge 110 of electric scooter 100 so that in this view of sealed storage compartment 1200, the top is open to the outside of electric scooter 100. In addition, the folded components of electric scooter 100 in the stowed configuration are shown being stored within sealed storage compartment 1200 (e.g., portions of steering assembly 128, including handlebar 132 and upper portion 210 of steering shaft 204, as well as seat 126 and seat post 1202).

In an example embodiment, sealed storage compartment 1200 includes a perimeter wall 1300 that surrounds and defines the outer perimeter of sealed storage compartment 1200. In an example embodiment, sealed storage compartment 1200 has a generally rectangular shape. In this embodiment, perimeter wall 1300 includes a bottom portion comprising a first bottom portion 1302 and a second bottom portion 1304. In this embodiment, first bottom portion 1302 extends deeper (i.e., farther down from top edge 110) than second bottom portion 1304 to accommodate the shape and size of seat 126 and seat post 1202, when in the stowed configuration. It should be understood, however, that other configurations of the bottom portion of sealed storage compartment 1200 may be provided to accommodate differently shaped and/or sized components of electric scooter 100 that may be folded into sealed storage compartment 1200 in the stowed configuration.

Perimeter wall 1300 also includes a first sloping portion 1306 extending from second bottom portion 1304 to a first side portion 1308. First side portion 1308 is adjacent to rear edge 108 of electric scooter 100 and extends upwards from first sloping portion 1306 towards top edge 110 of electric scooter 100. Perimeter wall 1300 also includes a second side portion 1310 located opposite first side portion 1308 towards front edge 106 of electric scooter 100 that extends from top edge 110 of electric scooter 100 towards a second sloping portion 1312. Second sloping portion 1312 extends downwards (e.g., in a direction towards bottom edge 112) to first bottom portion 1302. In an example embodiment, perimeter wall 1300 of sealed storage compartment 1200 is continuous through at least first side portion 1308, first sloping portion 1306, second bottom portion 1304, first bottom portion 1302, second sloping portion 1312, and second side portion 1310. With this arrangement, perimeter wall 1300 of sealed storage compartment 1200 defines the storage space of sealed storage compartment 1200 that may be used to store components of electric scooter 100 in the stowed configuration and to store objects (e.g., personal items, such as a phone, keys, coins, sunglasses, etc.) when electric scooter 100 is in the riding configuration.

In some embodiments, sealed storage compartment 1200 is configured to prevent objects (e.g., personal items, such as a phone, keys, coins, sunglasses, etc.) stored within sealed storage compartment 1200 from falling into internal mechanisms of electric scooter 100, such as, for example, sliding mechanism 1206 for rear wheel 116, described above. Referring now to FIG. 14, a representative view of objects falling into and resting along a bottom portion of perimeter wall 1300 of sealed storage compartment 1200 is shown. As shown in FIG. 14, one or more objects, for example, coins 500 and/or keys 502, may be placed or fall into sealed storage compartment 1200 through opening 120 along top edge 110 of electric scooter 100.

Once the objects (e.g., coins 500 and keys 502) are within sealed storage compartment 1200, the bottom portion of perimeter wall 1300, including first bottom portion 1302 and/or second bottom portion 1304, act to stop objects 500, 502 from falling farther into the interior of electric scooter 100 and interfering with or damaging internal mechanisms, such as sliding mechanism 1206. For example, as shown in FIG. 14, fallen objects (e.g., keys 502) are resting along second bottom portion 1304 of perimeter wall 1300 within sealed storage compartment 1200. First bottom portion 1302 may similarly prevent objects 500, 502 from falling father into the interior of electric scooter 100. For example, while electric scooter 100 is being ridden in the riding configuration, objects 500, 502 may move around within sealed storage compartment 1200. First bottom portion 1302 and/or second bottom portion 1304 of perimeter wall 1300 of sealed storage compartment 1200 catches objects 500, 502 from falling farther into the interior of electric scooter 100 and interfering with or damaging the internal mechanisms.

With this arrangement, sealed storage compartment 1200 is configured to house or store folded or stowed components of electric scooter 100 in the stowed configuration and also allows a user to carry one or more objects within sealed storage compartment 1200 while electric scooter 100 is being ridden without those objects falling into internal mechanisms of electric scooter 100.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

The invention claimed is:

1. A personal transport device, comprising:
  an outer casing having an opening extending along a top surface;
  a front wheel;
  a rear wheel;
  a steering assembly; and
  a sealed storage compartment located inside the outer casing, wherein the sealed storage compartment is located beneath the opening in the outer casing and above one or more internal mechanisms inside the outer casing;
  wherein the sealed storage compartment is configured to receive at least a portion of the steering assembly when the personal transport device is in a stowed configuration; and
  wherein the sealed storage compartment is configured to prevent objects from falling into the one or more internal mechanisms inside the outer casing when the personal transport device is in a riding configuration.

2. The personal transport device according to claim 1, wherein the sealed storage compartment includes a perimeter wall; and
  wherein the perimeter wall comprises a bottom portion, a first side portion, and a second side portion disposed opposite the first side portion.

3. The personal transport device according to claim 2, wherein the bottom portion comprises a first bottom portion and a second bottom portion; and
  wherein the first bottom portion is located closer to the opening in the outer casing than the second bottom portion.

4. The personal transport device according to claim 2, wherein the bottom portion, the first side portion, and the second side portion are continuous.

5. The personal transport device according to claim 2, wherein the perimeter wall of the sealed storage compartment includes a hinged panel attached to the bottom portion at a hinge.

6. The personal transport device according to claim 1, wherein a bottom of the sealed storage compartment is located above an arm of the rear wheel.

7. The personal transport device according to claim 1, wherein the steering assembly is foldable between an extended position where the at least a portion of the steering assembly is located outside of the outer casing and a stowed position where the at least a portion of the steering assembly is located inside the sealed storage compartment.

8. The personal transport device according to claim 1, further comprising a seat; and
  wherein the sealed storage compartment is configured to receive the seat when the personal transport device is in the stowed configuration.

9. A personal transport device, comprising:
an outer casing having an opening extending along a top surface;
a front wheel;
a rear wheel;
a seat connected to a seat post, wherein the seat post is attached internally inside the outer casing; and
a sealed storage compartment located inside the outer casing;
wherein the sealed storage compartment is configured to receive the seat when the personal transport device is in a stowed configuration; and
wherein the sealed storage compartment is configured to prevent objects from falling into one or more internal mechanisms inside the outer casing when the personal transport device is in a riding configuration.

10. The personal transport device according to claim 9, wherein the sealed storage compartment includes a perimeter wall; and
wherein the perimeter wall comprises a bottom portion, a first side portion, and a second side portion disposed opposite the first side portion.

11. The personal transport device according to claim 10, wherein the perimeter wall of the sealed storage compartment includes a hinged panel attached to the bottom portion at a hinge.

12. The personal transport device according to claim 11, wherein the seat post is attached internally inside the outer casing at a pivot mechanism; and
wherein the hinged panel includes a distal end that contacts an end portion of the seat post at or near the pivot mechanism.

13. The personal transport device according to claim 11, wherein the hinged panel is configured to move from an initial position to a lower position that is farther from the opening in the outer casing than the initial position when the seat is folded into the sealed storage compartment.

14. The personal transport device according to claim 10, wherein the bottom portion, the first side portion, and the second side portion are continuous.

15. The personal transport device according to claim 9, wherein the sealed storage compartment is located beneath the opening in the outer casing and above the one or more internal mechanisms inside the outer casing.

16. The personal transport device according to claim 9, further comprising a steering assembly that is foldable between an extended position where at least a portion of the steering assembly is located outside of the outer casing and a stowed position where the at least a portion of the steering assembly is located inside the sealed storage compartment.

17. A personal transport device, comprising:
an outer casing having an opening extending along a top surface;
a front wheel;
a steering assembly connected to the front wheel and configured to steer the front wheel of the personal transport device;
a rear wheel;
a mechanism connected to the rear wheel configured to move the rear wheel between an extended position outside of the outer casing and a retracted position inside of the outer casing;
a seat connected to a seat post, wherein the seat post is attached internally inside the outer casing; and
a sealed storage compartment located inside the outer casing;
wherein the sealed storage compartment is configured to receive the seat and at least a portion of the steering assembly when the personal transport device is in a stowed configuration; and
wherein the sealed storage compartment is configured to prevent objects from falling into the mechanism connected to the rear wheel inside the outer casing when the personal transport device is in a riding configuration.

18. The personal transport device according to claim 17, wherein the sealed storage compartment is located beneath the opening in the outer casing and above the mechanism inside the outer casing.

19. The personal transport device according to claim 17, wherein the sealed storage compartment includes a perimeter wall; and
wherein the perimeter wall comprises a bottom portion, a first side portion, and a second side portion disposed opposite the first side portion.

20. The personal transport device according to claim 17, wherein the sealed storage compartment includes a perimeter wall;
the perimeter wall including a hinged panel attached to a bottom portion at a hinge; and
wherein the hinged panel is configured to move from an initial position to a lower position that is farther from the opening in the outer casing than the initial position when the seat is folded into the sealed storage compartment.

* * * * *